3,219,731
PROCESS FOR PREPARING POROUS SHAPED STRUCTURES OF CARBON OR GRAPHITE
Karl Wilhelm Friedrich Etzel and Peter Johannes Alfred Bauer, both of Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 8, 1963, Ser. No. 314,621
Claims priority, application Germany, Oct. 12, 1962, F 38,015
8 Claims. (Cl. 264—29)

The present invention relates to a process for preparing porous shaped structures of carbon or graphite.

It has been known to prepare shaped structures from carbon or graphite by subjecting calcined petroleum or coal-tar pitch coke to which a pitch-containing binding agent has been added to a mixing process at a temperature within the range of 100° to 120° C. After mixing the plastic mass is shaped by extrusion, block pressing or screw extrusion or in some cases by a stamping process. The article which has thus been shaped is subjected to a burning process in a reducing atmosphere. The upper limit of the burning temperature is generally within the range of 1000° to 1300° C. The burning process may be followed by a graphitization which is carried out at a temperature of up to 3000° C. The shaped structures of coal or graphite prepared in this manner have a bulk density within the range of 1.5 to 1.7 g./cc.

For some fields of application shaped structures of coal or graphite are required that have a bulk density of less than 1.5 g./cc. Such shaped structures are in particular required for filtering purposes, as insulating materials that are unaffected by high temperatures and as burning elements.

It has been known to prepare shaped structures that are to be used for the above-mentioned purposes by mixing coke grains having dimensions within a definite very limited range with pitch-containing binding agents or resins and compressing them on a block press. The pressed articles are then subjected to a burning process which is similar to that of the conventional processes. The porous shaped structures of coal or graphite that are thus obtained have bulk densities within the range of 1 to 1.4 g./cc. Since in general mixtures of uniform grain size are used the shaped structures obtained by the aforesaid process have the desired porosity but they have the drawback that their edges are not firm whereby their use is impaired.

The present invention provides a process which enables the aforesaid disadvantages to be avoided and porous shaped structures of coal or graphite to be obtained which have a bulk density of about 1.0 g./cc. and whose edges are very firm.

In the process according to the invention a combination of coke and carbon black is used as the dry component and a combination of pitch and a usual resin is used as the binding agent. The mass formed of dry component and binding agent is shaped and the resulting shaped articles are calcined at about 1000° C. If required, the burning process may be followed by graphitization at a temperature within the range of about 2000° to about 3000° C. preferably about 2600° to about 3000° C. The graphitization temperature is advantageously about 3000° C.

The quality of the coke contained in the dry components is not of decisive importance. Cokes of different origin may be used, for example, petroleum cokes, coal-tar pitch cokes, furnace cokes or anthracites. It is suitable to use the coke in a finely ground form. What is important, however, is that carbon black is present. The portion of carbon black present may vary within wide limits. Mixtures, comprising 70 parts by weight of coke and 30 parts by weight of carbon black have proved to be particularly well suitable.

In general pitches or resins have been used alone for the preparation of the known shaped structures of coal or graphite whereas the binding agents used according to the invention are combinations of pitches with usual resins. Mixtures containing much resin and little pitch, for example, 80% of resin and 20% of coal-tar pitch, are particularly suitable.

As resins there may advantageously be used phenol-formaldehyde resins. When the combination according to the invention is used shaped structures are obtained which have extraordinarily high degrees of porosity and the edges of which are very firm.

In the known processes of preparing compact shaped structures of coal or graphite which have a bulk density of 1.5 to 1.7 g./cc. there are generally required for the shaping about 20 to 25 parts of binding agent, calculated on the dry component which is regarded as being equal to 100.

According to the invention, the substances from which the porous coals are prepared are used in proportions such that the dry mixtures absorbs the highest possible amount of binding agent (up to 50 parts, calculated on the dry component=100). Although high pressures are applied in the shaping process no binding agent is pressed out of the mixture. The gases formed by the splitting taking place in the heat treatment lead to the formation of a large pore space.

The shaped structures prepared by the process according to the invention have very firm edges, a bulk density within the range of 0.9 to 1.1 g./cc. and an accessible volume of pores of 45 to 55%.

It has proved to be suitable to use furfuryl alcohol instead of the resin component.

The following examples serve to illustrate the invention but they are not intended to limit it thereto, the parts and percentages being by weight.

EXAMPLE 1

70 parts of petroleum coke (70% <0.06 millimeter) and 30 parts of carbon black were mixed with a mixture of 5 parts of coal tar pitch (hard pitch having a softening point of 80° C.) and 40 parts of a phenol-formaldehyde resin. The mixture was shaped by the block pressing process under a specific pressure of 300 kg./cm.$^2$.

The shaped structure which had been prepared in this manner and which had a width of 200 millimeters and a length of 2200 millimeters was heated to 1000° C. in the course of 10 days and then cooled. It had a bulk density of 1.06 g./cc. and an accessible volume of pores of 45%. When worked on a lathe no parts of the cut surfaces cracked off. The surfaces that were obtained when the article was cut with a high-speed diamond cutting wheel were likewise neat.

EXAMPLE 2

65 parts of a coal-tar pitch coke and 35 parts of carbon black were mixed with a mixture of 20 parts of coal-tar pitch (soft pitch having a softening point of 62° C.) and 30 parts of furfuryl alcohol at a temperature of about 100° C., subjected to a stamping process and calcined as described in Example 1. The calcined shaped structures had a bulk density of 1.08 g./cc. and an accessible volume of pores of 43%.

EXAMPLE 3

Shaped structures that had been prepared in the manner described in Example 1 were calcined and then subjected to a graphitization process at a temperature of up to 3000° C. The speed at which they were heated was of no importance but the upper temperature had to be maintained for at least 4 hours.

The dimensions changed insignificantly only. The bulk density and the volume of pores remained practically unchanged. By the graphitization process the thermal and electrical conductivity of the shaped structures was considerably increased as compared with that of the shaped structures that had not been graphitized.

EXAMPLE 4

Shaped structures that had been prepared in the manner described in Example 2 were calcined and graphitized as described in Example 3 and the results obtained were analogous to those of Example 3.

We claim:

1. A process for the preparation of shaped structures of coal having a bulk density between about 0.9 and 1.1 g./cc. and an accessible volume of pores between about 45 to 55 percent which comprises shaping a mixture of coke and carbon black together with a mixture of pitch and a member selected from the group consisting of resin and furfuryl alcohol and calcining the resulting shaped structure at about 1000° C.

2. The process according to claim 1 wherein the mixture of coke and carbon black contains at least 30 percent by weight carbon black.

3. A process as claimed in claim 1, wherein a mixture of 70 parts by weight of coke and 30 parts by weight of carbon black is used.

4. A process as claimed in claim 1, wherein a mixture of a soft pitch and resin is used as the binding agent.

5. A process as claimed in claim 1, wherein a mixture of a hard pitch and resin is used as the binding agent.

6. A process as claimed in claim 1, wherein a mixture of 80% of resin and 20% of coal-tar pitch is used.

7. A process as claimed in claim 1, wherein furfuryl alcohol is used.

8. A process as claimed in claim 1, wherein the calcined shaped structures are graphitized at a temperature within the range of about 2000° to about 3000° C.

References Cited by the Examiner

UNITED STATES PATENTS

| | | | |
|---|---|---|---|
| 1,856,680 | 5/1932 | Williams et al. | 264—29 |
| 2,066,176 | 12/1936 | Girvin et al. | 264—105 XR |
| 2,088,422 | 7/1937 | Kemmer | 260—29 |
| 2,997,744 | 8/1961 | Stoddard et al. | 264—29 |
| 3,084,394 | 4/1963 | Bickerdike et al. | 264—105 XR |

FOREIGN PATENTS

| | | |
|---|---|---|
| 656,694 | 1/1963 | Canada. |
| 1,117,028 | 11/1961 | Germany. |
| 717,050 | 10/1954 | Great Britain. |

ROBERT F. WHITE, *Primary Examiner.*